United States Patent [19]
Mayfield

[11] 3,811,203
[45] May 21, 1974

[54] PUZZLE FOR PSYCHOLOGICAL TESTING

[76] Inventor: Susan Mayfield, 825 Crane Dr., Apt.103, De Kalb, Ill. 60115

[22] Filed: Apr. 12, 1973

[21] Appl. No.: 350,310

[52] U.S. Cl. ............................ 35/22 R, 273/157 R
[51] Int. Cl. ......................... G09b 1/36, A63f 9/10
[58] Field of Search............ 273/156, 157 R, 157 A; 35/22 R

[56] References Cited
UNITED STATES PATENTS
669,445 3/1901 Morey, Jr. .................... 273/157 R
1,325,369 12/1919 O'Brien ........................ 273/157 R Primary Examiner—Wm. H. Grieb
Attorney, Agent, or Firm—Marden S. Gordon

[57] ABSTRACT

A psychological testing device in the form of a puzzle having a plurality of interrelated substantially flat jigsaw puzzle elements, the elements divided into a minimum of three sets with each set including a total of four puzzle pieces of an identical shape and size, the puzzle pieces of any one set being different from the puzzle pieces of any other set, and with the puzzle pieces within each set being interchangeable amongst themselves with each adapted to occupy any one of the number of preset positions intended for anyone of the puzzle pieces of the particular set, and to occupy only such positions so that when the puzzle pieces of all of the sets are properly placed together a square is formed. The number of possible solutions of the puzzle is equal to $4^n$ where the numeral 4 represents the total number of puzzle pieces in any one set, and the letter $n$ represents the total number of sets in the puzzle.

7 Claims, 3 Drawing Figures

PUZZLE FOR PSYCHOLOGICAL TESTING

BACKGROUND OF THE INVENTION

1. Field of the Invention

This invention relates generally to psychological testing devices and more particularly to a specifically designed puzzle shaped testing device useful for measuring perceptual development, perceptual difficulties as experienced by autistic children, and provides such testing results as a modern art form readily acceptable to children being tested as a creative and play experience.

DESCRIPTION OF THE PRIOR ART

There is available a number of devices for use in the constantly developing field of psychological testing, but surveys conducted in the field as well as discussions with noted psychologists at universities throughout the country has indicated that there is presently no readily acceptable testing device available specifically designed for use with children as to detecting and correcting perceptual difficulties such as those experiences by autistic children.

Devices presently available normally meet with resistance from the child being tested due to the obvious fact that it is a test, which normally causes the child to rebel immediately at the thought of being tested with its associated social implications to success and failure; or else the test is one which requires closely controlled surrounding test conditions which results in placing the child in a strained and perhaps unfriendly cold type environment thereby again possibly encountering rebellion on the part of the child, but in any event, providing only partially valid testing results due to the child's unpredictable reaction to the testing environment.

Thus, while numerous testing devices are available, none adequately overcome the difficulties encountered between a child and the adult presenting the test due to either the nature or conditions surrounding the test as it is being conducted.

SUMMARY OF THE INVENTION

The present invention is designed to overcome the above-noted limitations that are attendant upon the testing of children for detecting, measuring and correcting perceptual difficulties such as those experienced by autistic children.

It is a feature of the present invention to provide a psychological testing device for use with children relative to measuring and detecting perceptual difficulties in a manner readily acceptable and welcomed by the child being tested.

A further feature of the invention is the provision of a psychological testing device in the shape of a modern art form type of puzzle for testing children in a manner resembling a creative and play experience for the child being tested, the puzzle specifically designed with a predetermined number of puzzle shapes and total number of each particular shape so that it is required that the child integrate the shape of the various puzzle pieces to arrive at an exact square shaped puzzle when all of the pieces are properly placed together.

Yet a further feature of the invention is the provision of the same type of surface finish on each side of the puzzle piece so that the piece can be utilized with either side upward thereby requiring greater concentration and integration of the puzzle shapes by the child being tested.

The provision of a psychological testing device for use with children, such as briefly outlined above, and possessing the stated advantages, constitutes the principle feature of the present invention. The provision of a psychological testing device which is simple in its construction and which therefore may be manufactured at a lost cost; one which is rugged and durable and which therefore will withstand many instances of rough usage at the hands of the children being tested; one which may be presented to the child to be tested in friendly surroundings without being readily identified as being a test device; and one which, otherwise, is well adapted to perform the services required of it, are further desirable features which may have been borne in mind in the creation and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same.

DESCRIPTION OF THE PREFERRED EMBODIMENT

With reference to the drawings as hereinafter set forth in greater detail, it is to be understood that for purposes of convenience the minimum size puzzle having a total of twelve pieces has been selected for illustration of the present invention, with it being understood that the total number of puzzle pieces may be increased as will be discussed hereinbelow.

Figure 1:
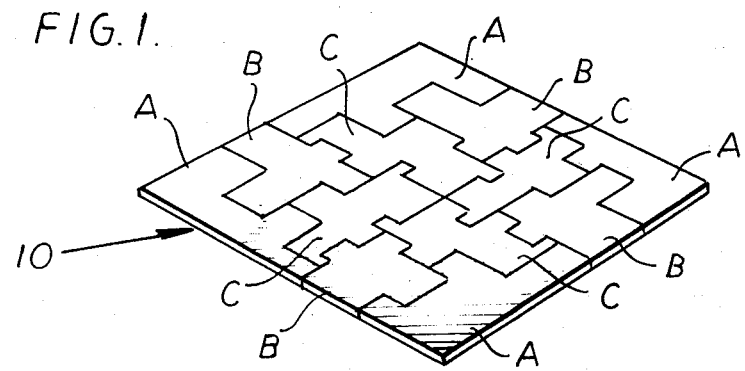
FIG. 1 is a front perspective view of the assembled puzzle.
Figure 2:
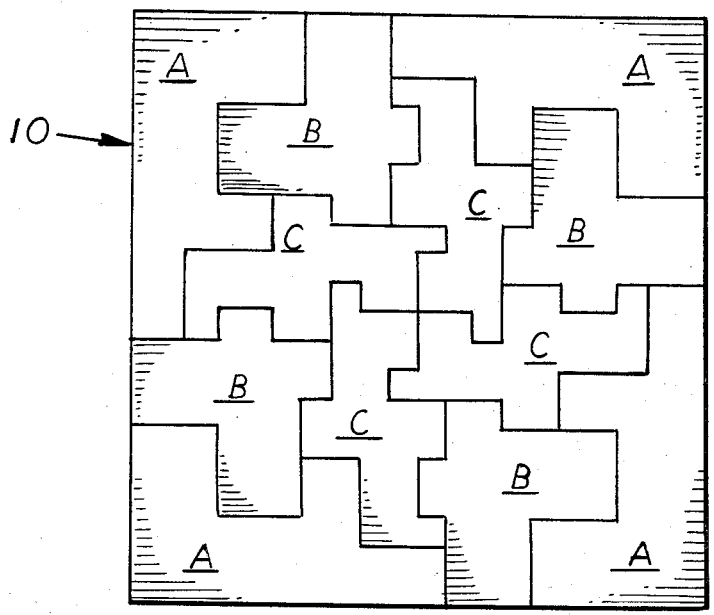
FIG. 2 is a top plan view of the assembled puzzle of FIG. 1.
Figure 3:
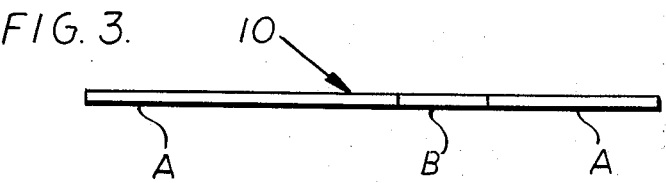
FIG. 3 is a front elevational view of the puzzle of FIG. 2.

Referring to FIGS. 1-3, reference numeral 10 generally designates a puzzle with all puzzle pieces properly placed together to form a square shape.

As illustrated, the puzzle 10 includes three different sets of puzzle pieces, with there being a total of four identically shaped and formed puzzle pieces in each set, the puzzle pieces of any one set being of a different size and shape than the puzzle pieces of any other set, the set and four pieces therein being identified by reference letters A, B and C.

It is noted that the four pieces of set A make up the four respective corners of puzzle 10, with the four pieces of set B interposed between puzzle pieces A and serving to assist in defining the outer perimeter of the puzzle when the pieces are properly assembled therein. Lastly, the four puzzle pieces of set C are received therein abutting adjacent ones of puzzle pieces A and B to provide a properly assembled square shaped puzzle having a total of twelve pieces therein.

It is to be noted that each of the puzzle pieces of each set A, B or C are interchangeable with each other so that they may operate any position in the puzzle designed for a puzzle piece of that particular set.

All of the puzzle pieces are made of relatively flat stock so that puzzle 10 is substantially flat with the finish on the face of each of the puzzle pieces being substantially identical to the finish on the back of each of the puzzle pieces so that the puzzle pieces can be flipped from one side to the other without any indication as to which side or direction it should be positioned when used to successfully complete the square shape of the puzzle.

Alternatively, the face of puzzle 10 may be provided with a design, figure, picture or pictorial clues by means of an appropriate overlay (not shown) or printing thereon (not shown) to either assist the individual in assembling the puzzle, or alternatively, to confuse the individual when attempting the assembly the puzzle, this being strictly determined by the design on the puzzle pieces thereby providing a puzzle having different testing capabilities.

Still further, it would be possible to place one design on the face of the puzzle 10 and a second different design on the back of the puzzle, the two designs being either similar in nature or different in nature, depending on what is being tested, thereby either simplifying or hardening the assembly of the puzzle pieces into the finished square shape by the child or individual being tested.

Preliminary tests of the present invention have indicated that utilization of this number of pieces identical in respect to their shape and physical size while providing that the pieces can only be used at certain locations on the puzzle, and further providing that certain of the pieces can be readily interchanged with each other, provides the child with a certain amount of assistance to the extent that the child learns that some of the pieces may be placed only at certain particular locations, but provides the child with the difficulty of learning a sufficient amount of information with respect to the overall puzzle design so as to properly select pieces which are interchangeable with each other as to use the correct piece at the correct location.

It must be appreciated and acknowledged that in the education and psychological testing field, numerous and various approaches have been made in an attempt to properly test children while maintaining the child's interest in the test in order to arrive at valid test results. It is apparent that if the child's interest can be maintained by the testing device, and the results valid, that testing not only becomes a easier task but it becomes one which is enjoyable to the child if it takes on the aspects of a game or creative venture. Thus, the present invention provides the psychological testing puzzle which entices a child to the extent that preliminary tests have shown that a child will occupy himself with the puzzle until he finally achieves the correct result, this being mainly because to it presents an interesting challenge to the child. Of course, if the child suffers severe perceptual handicaps he may eventually abandon his attempts to solve the puzzle, but it has been found that the child will eventually return to the puzzle as there is only one correct solution to properly assembling the same with the challenge of proper assembly being sufficient to encourage the child to successfully complete the puzzle and not be inclined to completely abandon the task.

It is to be understood that the number of total pieces in the puzzle can be increased to increase the difficulty of assembly, this depending on the age or nature of the child being tested, with it being kept in mind that it is a specific requirement that the puzzle always form an exact square containing the desired number of sets of identically shaped and sized pieces, with each set always having four identically shaped and sized pieces therein. Thus, while the number of sets in the puzzle can be varied, the puzzle must always have the shape of an exact square and there must always be at least four identical shaped and sized puzzle pieces making up each set.

Thus, by following this construction the number of solutions of the puzzle, considering the various positions of interchangeability between the puzzle pieces of each particular set, is defined as being equal to $4^n$ where the numeral 4 represents the total number of puzzle pieces in each set, and the reference letter $n$ represents the total number of sets in the puzzle to be solved.

For example, in the puzzle shown in FIGS. 1–3, the formula would read $4^3$ resulting in a total of 64 possible solutions.

The testing device of the present invention has been well received by children as a creative and play experience so that testing is accomplished in familiar and comfortable surroundings resulting in quite valid test results for determining and correcting perceptual difficulties such as those experienced by autistic children, as well as providing a valuable testing tool for measuring perceptual development.

In view of the specific combination of elements it is required that the child being tested integrate both the clues he receives from the shape of the puzzle pieces as well as any pictorial clues which may be available by any design imprinted on the puzzle, since the clues apparent by the shapes of the puzzle pieces are independent of the clues which are apparent by the design or picture on the face of the puzzle, thus requiring perceptual requirements by the child being tested to successfully assemble the puzzle in the square shape.

It is to be understood that the form of this invention herewith shown and described is to be taken as a preferred example of the same, and that this invention is not to be limited to the exact arrangement of elements shown in the accompanying drawings or described in this specification as various changes in the details of construction as to overall shape, size and arrangement of parts may be resorted to without departing from the spirit of the invention, the scope of the novel concepts thereof, or the scope of the sub-joined claims.

Having thus described the invention, what is claimed is:

1. A puzzle for psychological testing comprising a plurality of interrelated substantially flat jigsaw puzzle elements each adapted to occupy any one of a number of predetermined positions in the puzzle, and only those particular positions, such that when properly placed together in their appropriate positions a rectangular shape is formed; said puzzle elements comprising a plurality of sets of puzzle pieces; each set comprising four identically sized and shaped puzzle pieces; the puzzle pieces of each set being of a different shape and size from the puzzle pieces of each other set; the puzzle pieces of each set adapted for interchangeable relationship relative to every other puzzle piece in the same set with each puzzle piece in any one set adapted to occupy any position intended for any one of the other puzzle pieces in the same set; and each puzzle piece of each set having a similarly finished front and back surface so that puzzle pieces may be used with either the front surface facing upwards or the back surface facing upwards when assembling all of the puzzle pieces such that when properly placed together a square is formed.

2. A puzzle for psychological testing as claimed in claim 1 further characterized by there being a minimum number of three sets forming the puzzle with each set consisting of four identically shaped and sized interchangeable puzzle pieces thus making a minimum total number of twelve puzzle pieces in the puzzle.

3. A puzzle for psychological testing as claimed in claim 2 further characterized by the corner puzzle pieces each being of the same set and adapted for assembly in the puzzle in positions where each corner puzzle piece simultaneously contacts at least one puzzle piece of each of the other sets when the square puzzle is properly assembled.

4. A puzzle for psychological testing as claimed in claim 2 further characterized by the number of possible positions of the puzzle pieces to correctly assemble the square shaped puzzle is defined by the formula $4^n$ where 4 represents the number of puzzle pieces in each set and n represents the total number of sets in the puzzle.

5. A puzzle for psychological testing as claimed in claim 1 further characterized by the sets of puzzle pieces having one of the sets including four interchangeable corner puzzle pieces; the second of the sets including four interchangeable edge puzzle pieces adapted for positioning adjacent and contacting at least one of the respective corner puzzle pieces for assisting in defining the outermost perimeter of the puzzle; and the third of the sets including interchangeable puzzle pieces adapted for disposition in the puzzle relative to the first and second sets to complete the square shape of the fully assembled puzzle when the puzzle pieces are properly placed together.

6. A puzzle for psychological testing as claimed in claim 5 further characterized by the corner puzzle pieces of the first set each being adapted for positioning in the puzzle to define the four outermost corners of the square puzzle perimeter; and each corner puzzle piece adapted to simultaneously contact in an abutting manner at least one puzzle piece of the second set and one puzzle piece of the third set in a specific predetermined manner to complete assembly of the aquare shaped puzzle when all of the puzzle pieces are properly placed together in their intended manner.

7. A puzzle for psychological testing as claimed in claim 6 further characterized by the number of possible positions of the puzzle pieces to correctly assemble the square shaped puzzle is defined by the formula $4^n$ where 4 represents the number of puzzle pieces in each set and n represents the total number of sets in the puzzle.

* * * * *